(12) United States Patent
La Pietra et al.

(10) Patent No.: US 9,269,165 B2
(45) Date of Patent: Feb. 23, 2016

(54) RIB ENHANCEMENT IN RADIOGRAPHIC IMAGES

(71) Applicant: Carestream Health, Inc., Rochester, NY (US)

(72) Inventors: Lynn M. La Pietra, Rochester, NY (US); Zhimin Huo, Pittsford, NY (US); Mary E. Couwenhoven, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 50 days.

(21) Appl. No.: 14/246,455

(22) Filed: Apr. 7, 2014

(65) Prior Publication Data

US 2014/0376798 A1   Dec. 25, 2014

Related U.S. Application Data

(60) Provisional application No. 61/837,325, filed on Jun. 20, 2013.

(51) Int. Cl.
*G06T 11/00* (2006.01)
*G06T 5/00* (2006.01)
*G06T 5/50* (2006.01)

(52) U.S. Cl.
CPC ............... *G06T 11/00* (2013.01); *G06T 5/001* (2013.01); *G06T 5/50* (2013.01); *G06T 2207/10016* (2013.01); *G06T 2207/10116* (2013.01); *G06T 2207/30008* (2013.01); *G06T 2207/30012* (2013.01); *G06T 2207/30064* (2013.01)

(58) Field of Classification Search
CPC .......... G06T 2207/30008; G06T 2207/30012
See application file for complete search history.

(56) References Cited

U.S. PATENT DOCUMENTS

| | | | | |
|---|---|---|---|---|
| 7,085,407 B2 * | 8/2006 | Ozaki | ............... | G06T 7/0083 128/922 |
| 2007/0019852 A1 | 1/2007 | Schildkraut et al. | | |
| 2009/0060366 A1 * | 3/2009 | Worrell | ............... | G06K 9/346 382/256 |
| 2009/0060372 A1 * | 3/2009 | Maton | ............... | G06K 9/346 382/264 |
| 2009/0190818 A1 * | 7/2009 | Huo | ............... | G06K 9/4609 382/132 |
| 2009/0214099 A1 * | 8/2009 | Merlet | ............... | G06T 7/0081 382/132 |
| 2009/0290779 A1 | 11/2009 | Knapp et al. | | |
| 2013/0083987 A1 * | 4/2013 | Novak | ............... | G06T 7/0083 382/131 |
| 2013/0108135 A1 * | 5/2013 | Huo | ............... | G06T 7/0083 382/132 |
| 2014/0140479 A1 * | 5/2014 | Wang | ............... | A61B 6/482 378/62 |
| 2014/0233820 A1 * | 8/2014 | Wu | ............... | A61B 6/505 382/131 |
| 2014/0376798 A1 * | 12/2014 | La Pietra | ............... | G06T 5/001 382/132 |

OTHER PUBLICATIONS

Suzuki et al., Image-Processing Technique for Suppressing Ribs in Chest Radiographs by Means of Massive Training Artificial Neural Network (MTANN), IEEE Transactions on Medical Imaging, vol. 25, No. 4, Apr. 2006, pp. 406-416.

(Continued)

*Primary Examiner* — Avinash Yentrapati

(57) ABSTRACT

A method for radiographic imaging obtains a radiographic image of a patient's chest and processes the obtained image to generate a default radiographic image and a bone-enhanced image. At least a portion of one or more ribs within the default radiographic image is detected and a rib mask generated according to the at least the detected portion of the one or more ribs. The rib mask is applied to the bone-enhanced image to define masked enhanced image content that includes the detected at least the portion of one or more ribs. A composite image that combines the masked enhanced image content with the default radiographic image is generated and displayed.

18 Claims, 15 Drawing Sheets

(56) References Cited

OTHER PUBLICATIONS

Vogelsang et al., "Detection and Compensation of Rib Structures in Chest Radiographs for Diagnose Assistance," Proceedings of SPIE, 3338, pp. 774-785, Feb. 1998.

Vogelsang et al., "Model based analysis of chest radiographs," Proceedings of SPIE, 3979, pp. 1040-1052, 2000.

Loog et al., Filter learning: Application to suppression of bony structures from chest radiographs, Medical Image Analysis, 10, pp. 826-840, 2006.

* cited by examiner

RIB ENHANCEMENT IN RADIOGRAPHIC IMAGES

CROSS REFERENCE TO RELATED APPLICATIONS

Priority is claimed from U.S. Ser. No. 61/837,325, provisionally filed on Jun. 20, 2013, entitled "RIB ENHANCEMENT IN RADIOGRAPHIC IMAGES", in the names of LaPietra et al., and which is incorporated herein by reference in its entirety.

FIELD OF THE INVENTION

The present invention relates generally to the field of radiographic imaging and more particularly to methods for detecting and enhancing rib features from a radiographic image.

BACKGROUND OF THE INVENTION

The chest x-ray is useful for detecting a number of patient conditions and for imaging a range of skeletal and organ structures. Conventional radiographic images of the chest are useful for detection of lung nodules and other features that indicate lung cancer, other pathologic structures and other life-threatening conditions. In clinical applications such as in the Intensive Care Unit (ICU), chest x-rays can have particular value for indicating pneumothorax as well as for tube/line positioning, and other clinical conditions. To view the lung fields more clearly and allow accurate analysis of a patient's condition, it is useful to suppress the rib cage and related features in the chest x-ray, without losing detail of the lung tissue or other features within the chest cavity.

A different set of considerations applies for trauma patients, particularly with pediatric cases. With very young children, chest and other x-rays can provide the only practical method for identifying and assessing trauma, such as from accidents or mishandling of the child, including child abuse cases such as shaken-baby syndrome and the like. In such cases, enhancement of rib and other bone structures can be of particular value for identifying rib fractures and related bone damage. Utilities that help to provide a more accurate diagnosis and assessment of rib trauma and injury can help to increase staff confidence as to whether or not intervention is required as well as providing evidence in abuse cases. In addition, proper levels of enhancement can help to reduce the need for retakes and consequent added radiation exposure to the patient.

Conventional chest x-ray enhancement processing identifies the enclosed lung field content and suppresses surrounding rib content that obstructs image content of the lung tissue. For trauma identification and assessment, however, somewhat a reverse of this processing approach is needed. That is, the full rib cage, particularly posterior regions, must be identified and enhanced to allow better visibility of fractures and related conditions. This includes portions of the skeletal structure that lie outside the lung area or the area typically associated with a lung mask. It can be appreciated that the problems of rib identification and segmentation can be fairly complex due to the need to identify the full extent of the rib cage and related skeletal structure within and outside the lung regions, including areas over the heart region, subdiaphragmatic regions, and including bony and connective cartilaginous structures that link the ribs to the spine.

It can be appreciated that there is a need for methods that detect and enhance rib and other bone content in radiological images.

SUMMARY OF THE INVENTION

Embodiments of the present invention address the need for improved processing of rib and related bone content in radiography images. Advantageously, enhancement processing for ribs can be performed without noticeable impact on other portions of the x-ray image.

According to one aspect of the invention, there is provided a method for radiographic imaging, comprising: obtaining a radiographic image of a patient's chest and processing the obtained image to generate a default radiographic image and a bone-enhanced image; detecting at least a portion of one or more ribs within the default radiographic image; generating a rib mask according to the at least the detected portion of the one or more ribs; applying the rib mask to the bone-enhanced image to define masked enhanced image content that includes the detected at least the portion of one or more ribs; and generating and displaying a composite image that combines the masked enhanced image content with the default radiographic image.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1A:
FIG. 1A is a plan view showing a conventional prior art rib mask that conforms to a lung outline.

Priority is claimed from U.S. Ser. No. 61/837,325, filed as a provisional patent application on Jun. 20, 2013, entitled "RIB ENHANCEMENT IN RADIOGRAPHIC IMAGES", in the names of LaPietra et al. and which is incorporated herein by reference in its entirety.

The following is a detailed description of the preferred embodiments of the invention, reference being made to the drawings in which the same reference numerals identify the same elements of structure in each of the several figures.

Where they are used, the terms "first", "second", "third", and so on, do not necessarily denote any ordinal or priority relation, but may be used for more clearly distinguishing one element from another.

Conventional rib detection algorithms are typically directed to identifying and suppressing rib content in order to allow improved visibility of lung tissue within the radiographic image. Because of this, conventional imaging methods typically begin by identifying the lung region with a lung mask, then ignore areas outside the lung region in rib detection and other subsequent image processing. In contrast to the conventional approach, embodiments of the present invention are directed to providing enhanced images that show the full rib structure, including connective structures between posterior portions of the rib and spine.

Figure 1B:
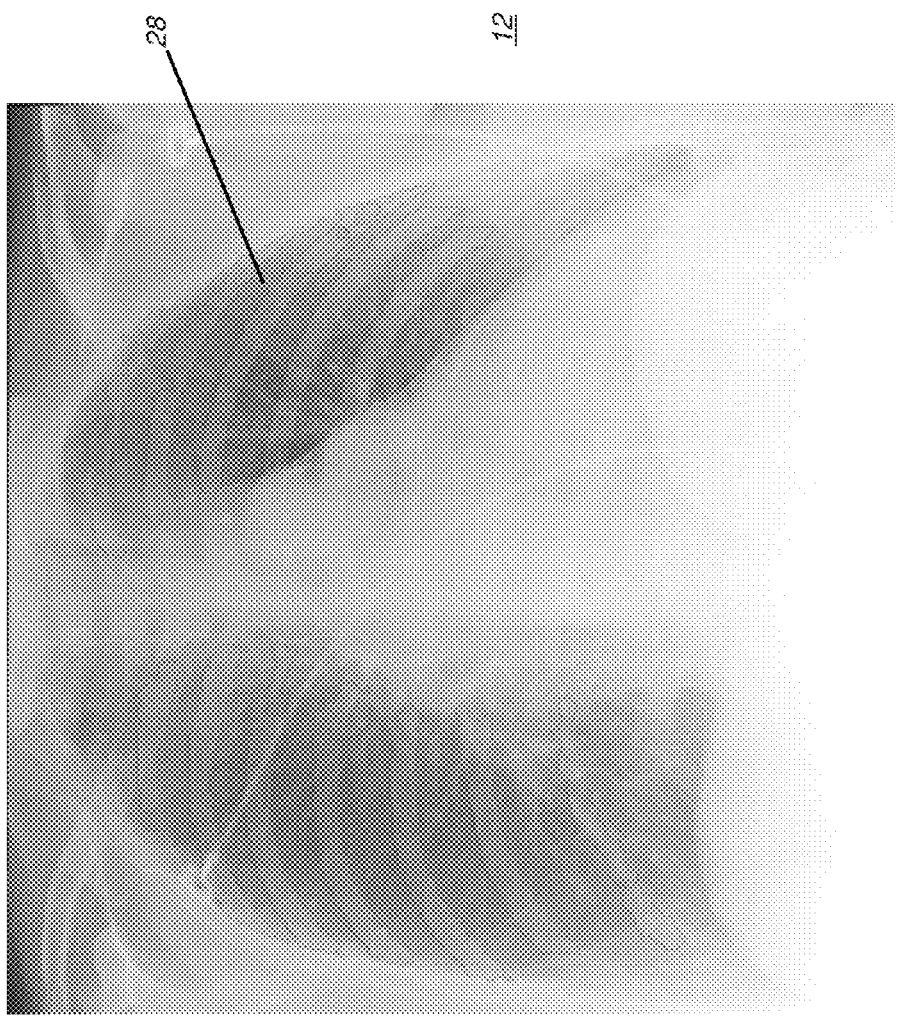
FIG. 1B is a plan view showing conventional prior art rib edge detection over the lung field.

FIG. 1A is a plan view of a processed radiographic image 10 showing a conventional rib mask 14 that conforms to a lung outline. As illustrated, the rib areas outside the lung region are excluded. FIG. 1B is a plan view of an image 12 showing conventional rib edge detection that results from use of a lung outline or mask, such as that used for the rib arrangement in FIG. 1A. Rib portions that surround the lungs 28 are visible; rib portions outside the lung area, however, are difficult to perceive.

Figure 1C:
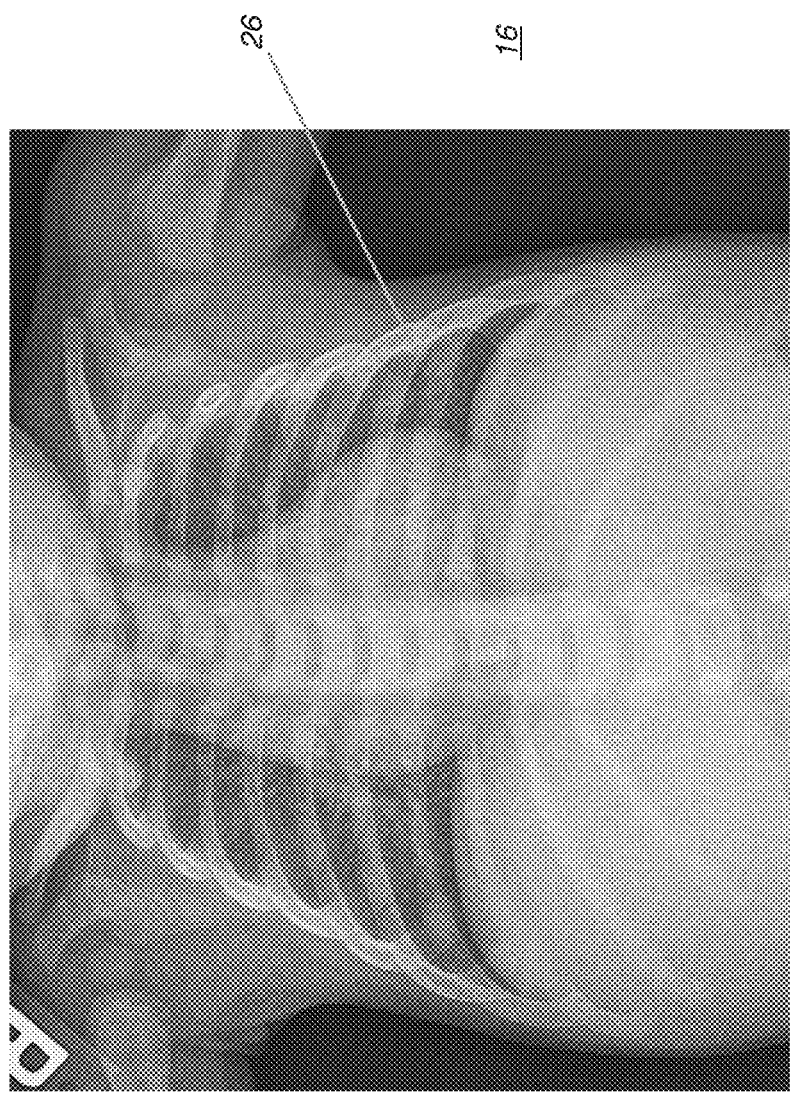
FIG. 1C is a plan view that shows rib structures, including structure lying outside the lung mask.

In contrast to the conventional rib suppression presentation shown in FIG. 1B, FIG. 1C is a plan view of an image 16 for a chest x-ray for a pediatric patient that shows rib structures 26, including structure lying outside the lung mask, using an embodiment of the present invention. Included in FIG. 1C are enhanced structures for the spine and other features. By comparison with the processing that generates an image for rib suppression as in FIG. 1B, the image of FIG. 1C has rib content outside the lung mask area. In addition, the FIG. 1C treatment makes it possible to view at least some portion of rib content from both posterior and anterior sides of the patient. It is instructive to point out that the enhanced image of FIG. 1C requires processing of the rib content outside the region of the lungs.

Figures 2A, 2B:
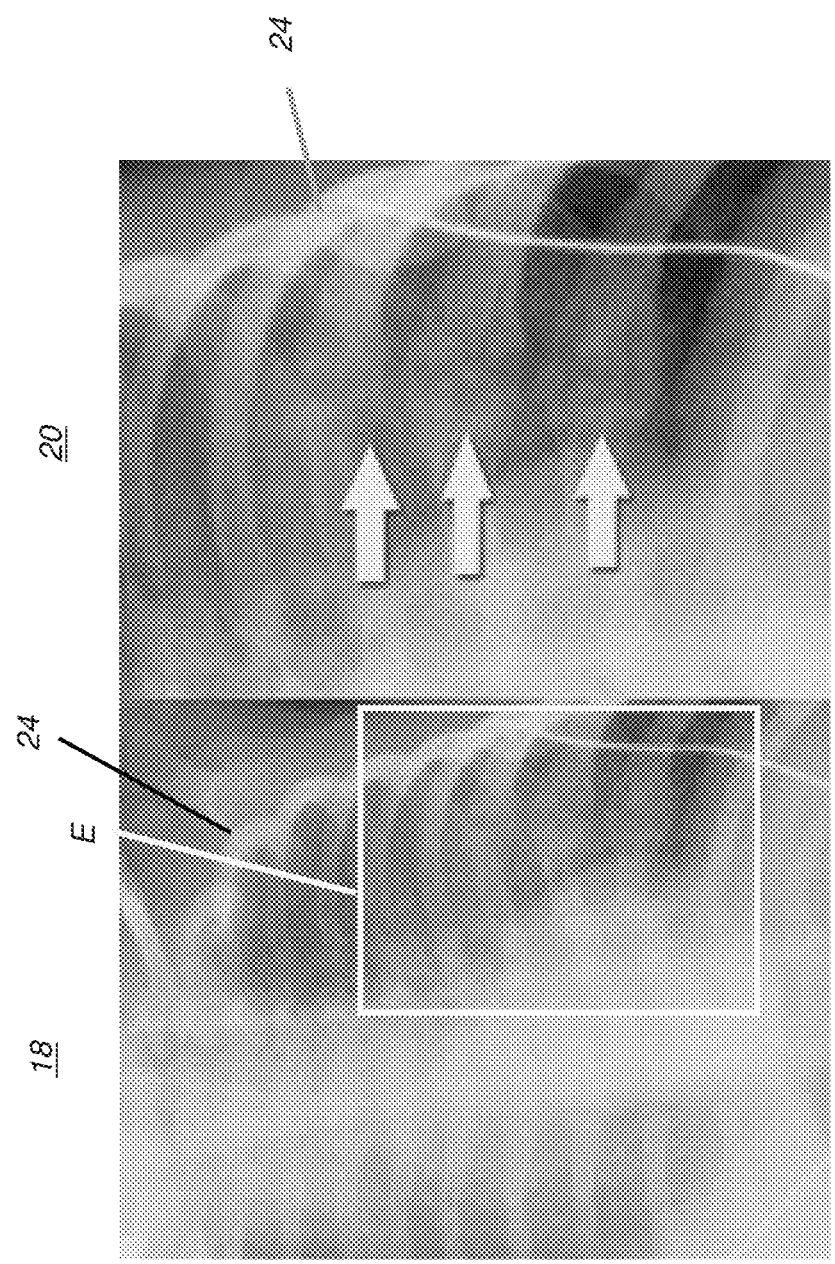
FIG. 2A is a plan view that shows a portion of a rib cage with fractures.
FIG. 2B is a close-up view showing some of the fractures from FIG. 2A.
Figure 2C:
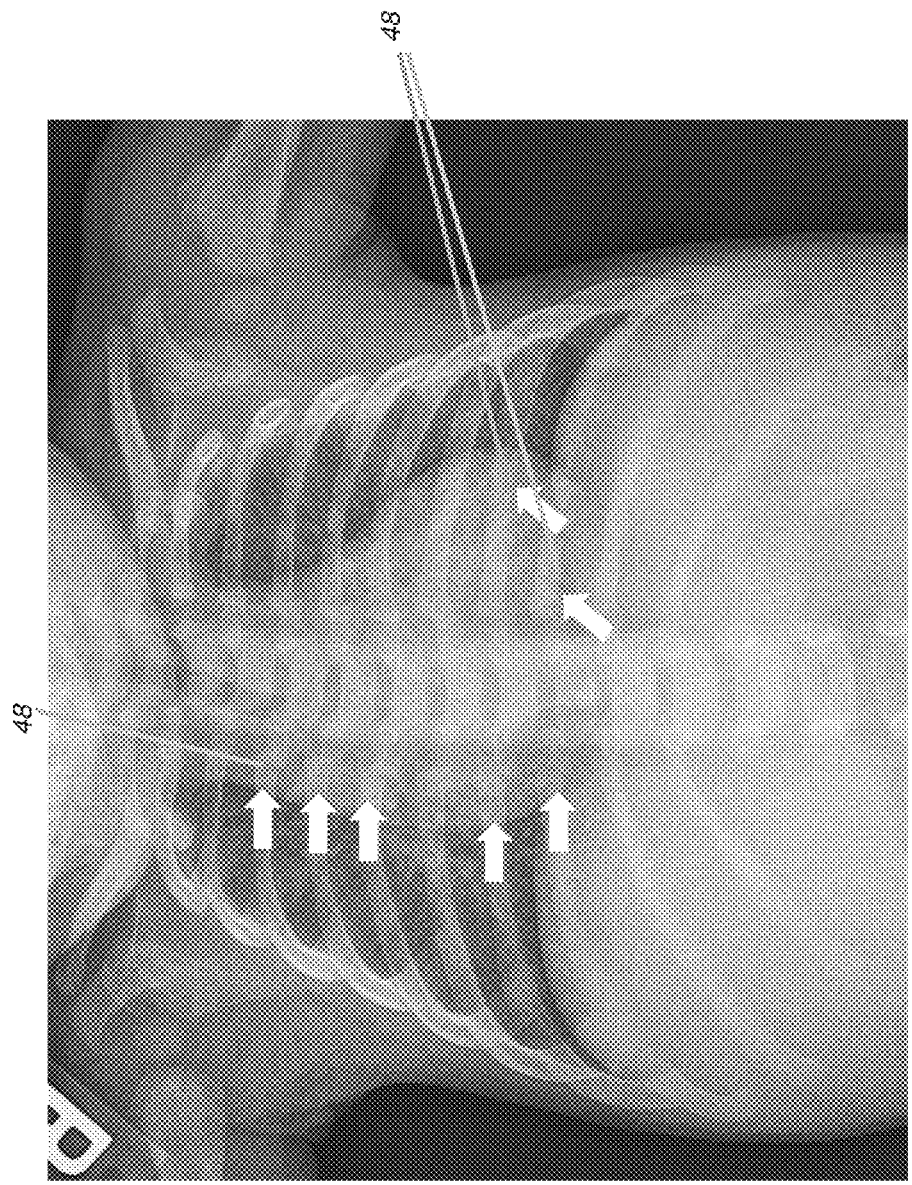
FIG. 2C is a plan view that shows a number of fractures along posterior rib portions in an enhanced image according to an embodiment of the present invention.

FIG. 2A is a plan view of an image 18 that shows a portion of a rib cage 24 with fractures. Fractures lying within an inset E in FIG. 2A are shown more clearly in enlarged form in an image 20 in FIG. 2B. FIG. 2C shows an image 22 of a child's anatomy having a number of fractures 48 along posterior rib portions. Arrows in FIG. 2C indicate some of the more prominent fractures 48 that can be identified in enhanced image 22.

Figure 3:
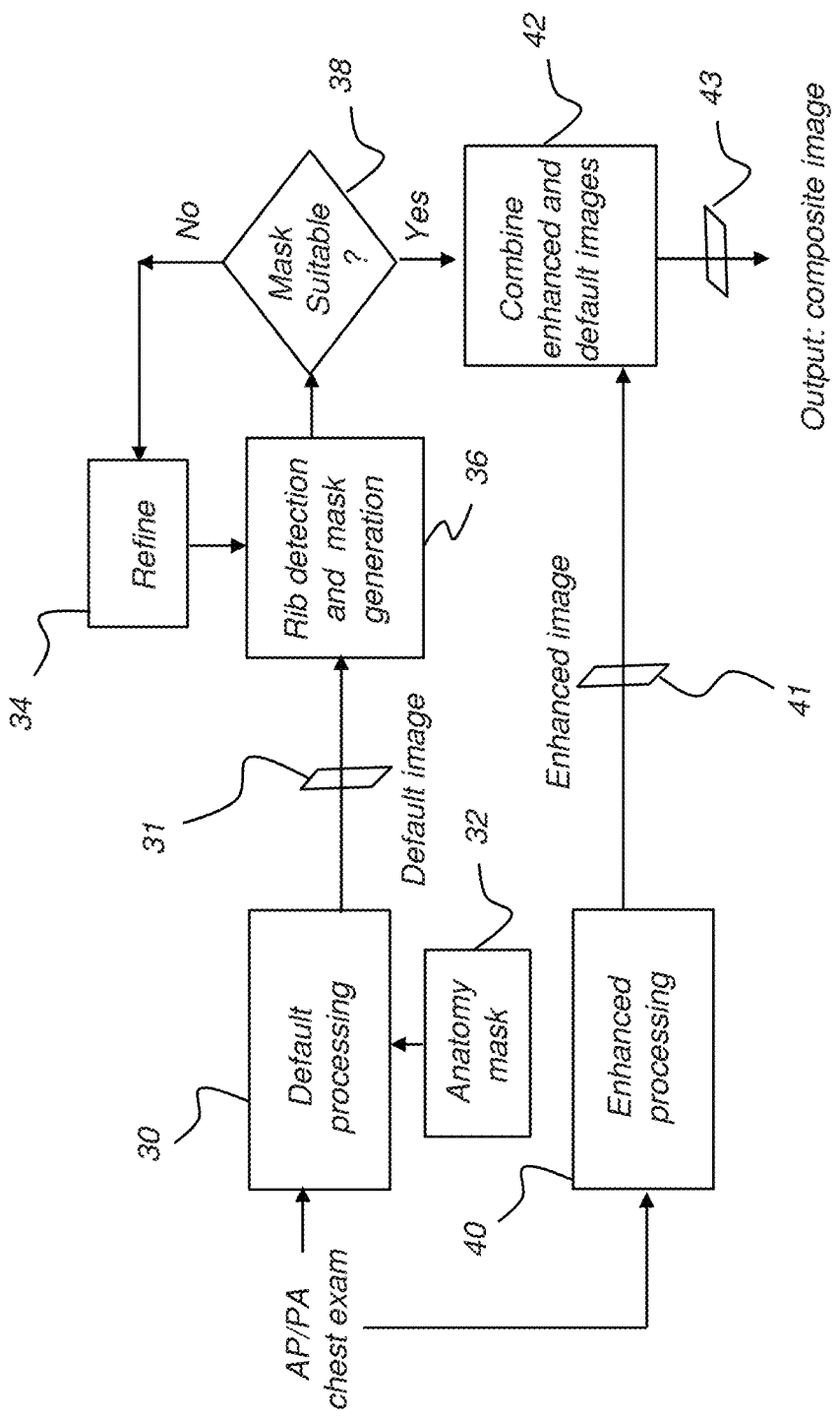
FIG. 3 is a logic flow diagram with a sequence for providing an output image with rib enhancement according to an embodiment of the present invention.

FIG. 3 is a logic flow diagram with a sequence consistent with an embodiment of the present invention for providing an output image with rib enhancement for an AP (Anterior-Posterior) or PA (Posterior-Anterior) chest exam image, or for an image of the chest obtained from other than conventional angles. The chest x-ray image can originate from a digital radiography (DR) detector or from scanned image data. This image data may also be obtained from an image archive, such as a PACS (picture archiving and communication system). A default processing step 30 provides initial processing of the image, which may include various types of noise reduction, adjustment for tone scale, sharpness enhancement, and detail and contrast enhancement, for example. Default processing procedures are well known to those skilled in the radiography arts and can take into account various factors including, for example, energy levels used; equipment setup, distances, and collimation; and detector type and manufacturer. In general, a goal of default processing is to normalize image content so that subsequent processing more effectively enhances features of interest. Default processing generates a default radiographic image 31.

Figure 4:
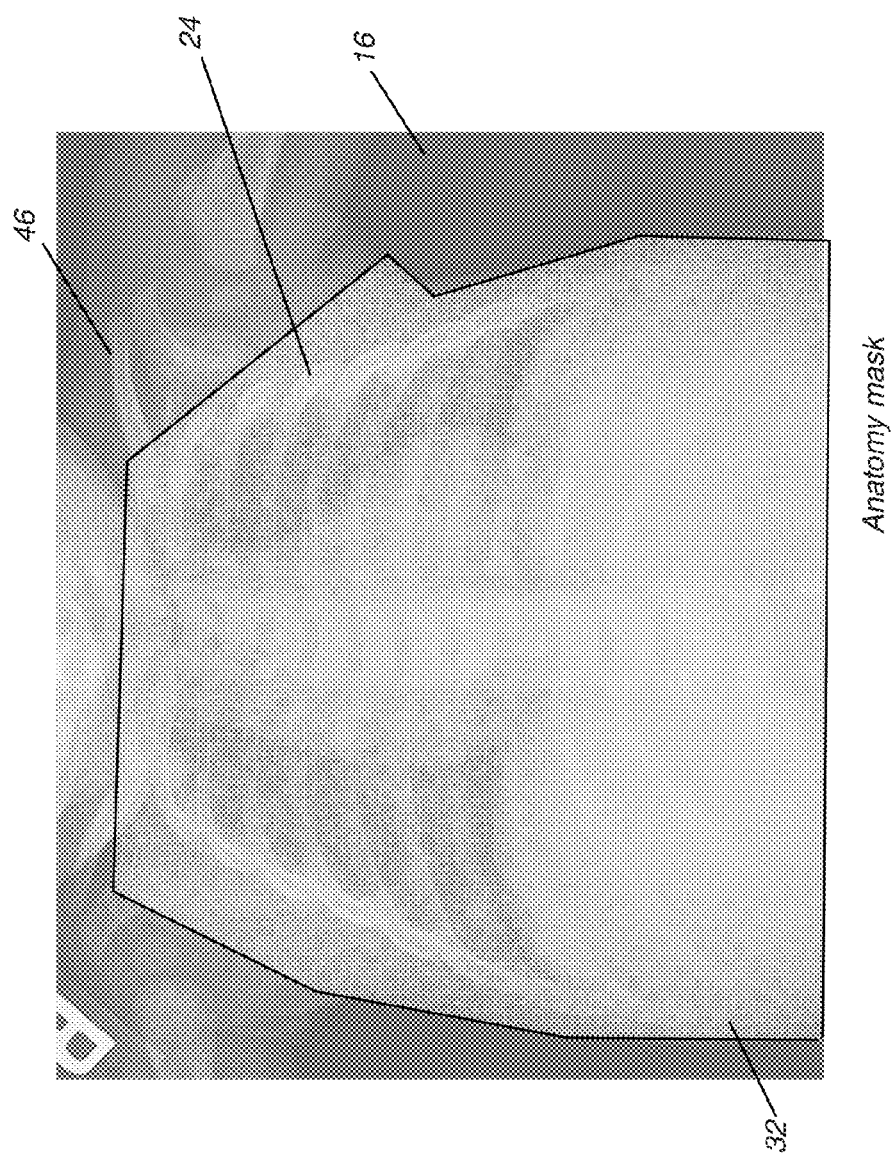
FIG. 4 shows an exemplary anatomy mask according to an embodiment of the present invention.

Following default processing step 30 in the FIG. 3 sequence, an anatomy mask 32 is generated according to analysis of the processed default image. The function of anatomy mask 32 is to eliminate background image content from further processing and to help provide some information that locates the general position and direction of rib structures. By way of example, FIG. 4 shows anatomy mask 32 for image 16 of FIG. 1C. Here, image mask 32 isolates the rib cage 24 region of the patient and eliminates background content and other anatomy that is not of interest, including a clavicle 46, as well as shoulders and upper arms, and neck and head region, for example. The anatomy mask 32 represented in FIG. 4 is one example. The overall function of the anatomy mask 32 is to direct attention to the chest region of the patient and to eliminate, as much as possible, areas of the image where intensive processing and enhancement would not be useful.

According to the sequence shown in FIG. 3, the anatomy mask 32 shown in the example of FIG. 4 is generated from analysis of the image content itself. There are options for generating anatomy mask 32 from the processed default image, known to those skilled in the imaging arts. According to an embodiment, a lung mask is used as a starting point for generating anatomy mask 32. Applied to the default radiographic image, the lung mask helps to provide additional information that can be used for more closely identifying rib placement. Anatomy mask 32 is then grown outward from the starting point of the lung mask until the background in the default radiographic image is detected in this approach. In an alternate embodiment, anatomy mask 32 is selected from a library of different masks that provide a general pattern for rib cage structure. Selection of a particular mask 32 from such a library is based on factors such as patient size, age, view, and suitability to features of the obtained radiography image. Selection of the mask can be algorithmically performed or may be performed by an operator.

Figure 5:
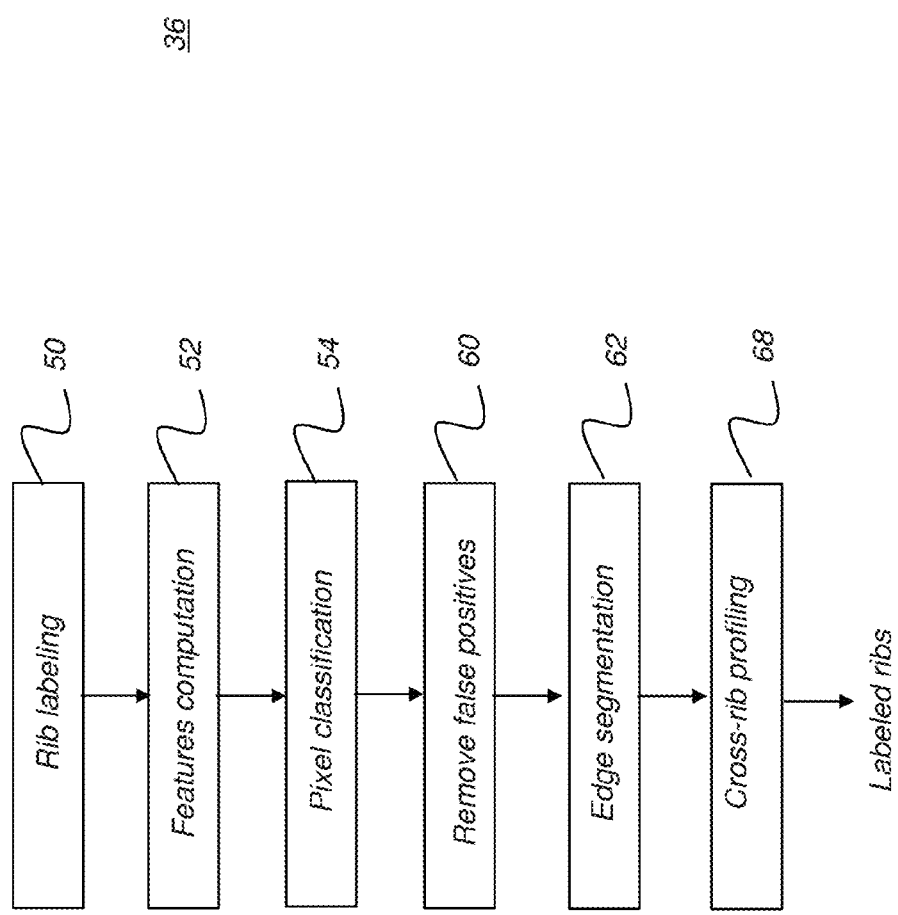
FIG. 5 is a logic flow diagram showing an exemplary sequence of steps for rib detection according to an embodiment of the present invention.

The anatomy mask 32 is applied to the processed image. Given the constrained image area defined by anatomy mask 32, the FIG. 3 processing sequence continues with a rib detection and mask generation step 36. Detailed sub-steps for rib detection and mask generation step 36 are shown in FIG. 5 and include a number of supporting sub-steps for labeling, pixel classification, false positive correction, segmentation, medial axis extraction, smoothing, modeling, growing, profiling, and mask detection, for example, as described in more detail subsequently. Rib detection and mask generation step 36 applies image processing for rib detection to the default image processing results for identifying and segmenting at least a substantial portion of the rib content. Structural information about rib features is used in conjunction with relative image pixel intensities to separate likely rib content from non-rib image content. The candidate rib content is coarsely identified and classified in a rib labeling step 50 that groups and organizes the detected rib contents. In rib labeling step 50, classification of the rib content groups likely rib pixels into corresponding categories for labeling as part of individual ribs. Labeling step 50 labels these pixels as part of the rib content of the image.

Continuing with the sequence of FIG. 5, rib labeling step 50 determines, for pixels in the region of interest, whether or not each pixel corresponds to a rib structure. A features computation step 52 computes features for each pixel, such as providing Gaussian derivative features information and position information, for example. Next, as part of rib detection and mask generation step 36, a pixel classification step 54 determines whether each pixel within the lung region is a rib pixel or non-rib pixel. Classifier techniques such as artificial neural network, supporting vector machine, random forest analysis, and other classifier techniques are well known to those skilled in the image analysis arts and can be used to perform the pixel classification.

A false positive removal step 60 then helps to remove false positives from processing. Position, shape information, and gradient data are used, for example, to help eliminate false positives. Processing in steps 50, 52, 54, and 60 provides for classifying pixels into one or more of multiple ribs, by using some amount of prior knowledge of rib structures, such as shape, position, and general edge direction, and by applying morphological filtering. Among characteristics that have been found to be particularly useful for rib classification are rib width and position, including percentage of pixels initially determined to be part of a rib structure. Other features could similarly be extracted and used for false-positive removal. Rib labeling in labeling step 50 alternately calculates a medial axis for one or more ribs to generate a skeletal image for validating rib detection and for subsequent processing including rib modeling for retrieving missing or missed labeled ribs or portions of ribs. The skeletal image has medial axis information and, optionally, other anatomical data relevant to rib location.

Characteristics such as gradient orientation and shape for the labeled rib content can then be used for subsequent processing in a rib edge segmentation step 62. In rib edge segmentation step 62, edge portions of the ribs are identified, and this identification is refined using iterative processing. Guided growth processing may alternately be used to enhance rib edge detection. A cross-rib profiling step 68, by considering image content in a direction that is substantially orthogonal to the medial axis for a rib, then generates a cross-rib profile that provides values for rib compensation along the detected ribs. As a result of the processing in FIG. 5, a more accurate outline of the ribs is obtained for use in generating the rib mask.

As the FIG. 5 sequence illustrates, within rib detection and mask generation step 36, false-positive pixels are removed as early as possible from processing steps. A grouping process determines whether or not one or more groups of detected pixels can themselves be grouped together as one individual rib, based on factors such as positional relationship, connectedness and adjacency, gradient features, and pixel position relative to the central axis of individual groups. These ribs can be labeled according to rib pattern. Global rib modeling, based on ribs that have already been labeled and based on known anatomical relationships, can be used to detect a missing rib from the previous steps.

Various rules are applied as part of rib detection and are helpful in determining whether or not a selected feature is rib or non-rib material. For example, a generally piecewise parallel relationship of medial lines is expected, with some variability allowable over the extent of the rib structure. Some amount of curvature with respect to medial lines or rib edges is anticipated. Connective tissues near the spine can be readily distinguished once rib structures are identified and image processing can locate and highlight these structures. For rib growth, it can be helpful to begin with rib structure that corresponds to a lung mask, thus taking advantage of existing work that is done for rib suppression, such as that described in U.S. 2013/0108135 entitled "RIB SUPPRESSION IN RADIOGRAPHIC IMAGES" by Huo, for example. Additional growth beyond the lung mask is then expected and spatial relationships should fall within certain well-defined limits.

It is noted that rib detection can alternately precede default processing step 30. In an alternate embodiment of the present invention, anatomy mask 32 is generated from the unprocessed image data, and rib detection then applied to this unprocessed data. Default processing is applied at a later stage of the detection process in order to enhance the rib content separately from the balance of the image. It can be appreciated that other changes to the order of steps shown in FIG. 3 can alternately be performed, within the scope of the present invention. For example, steps 30 and 40 for generating default image 31 and enhanced image 41, respectively, can be executed independently of each other. Anatomy mask 32 can be applied to the default image later in processing, such as during initial sub-steps of rib detection and mask generation step 36, for example.

Figure 6:
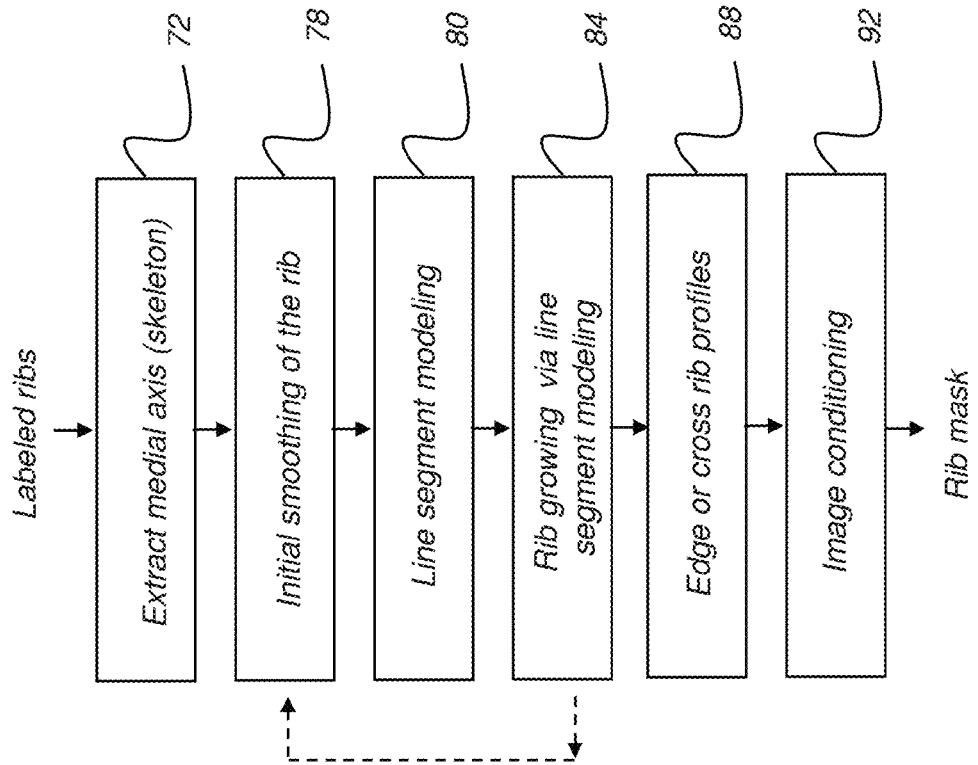
FIG. 6 is a logic flow diagram showing an exemplary sequence of steps for rib mask generation according to an embodiment of the present invention.

The logic flow diagram of FIG. 6 shows iterative processing that is performed for each detected or labeled rib in order to generate the rib mask, after the processing described with respect to FIG. 5, as a further part of rib detection and mask generation step 36. The input to this processing is the set of labeled ribs. A medial axis extraction step 72 obtains the medial axis of each rib. An initial smoothing step 78 performs any necessary fitting in order to smooth rib edges, according to the extracted medial axis. As part of smoothing step 78, the smoothed boundaries provide a starting point for more closely approximating rib edges. Using the smoothed rib contour, one or more line segments for the upper or lower rib boundaries are generated as initial rib edge candidates. Next, in a line segment modeling step 80, one or more additional line segment candidates for each segment are generated based on calculated gradients or other features. A set of the best-fit edge candidates for the upper and lower rib edge is selected, using optimization of a model based on factors such as edge gradients, rib width, line segment smoothness, and rib shape constraints. This best-fit processing uses modeling and shape fitting techniques familiar to those skilled in the image processing arts.

Continuing with the sequence of FIG. 6, a rib growing step 84 continues the line segment optimization process of modeling step 80 to extend existing line segments and merging disconnected line segments as they are detected or extrapolated from existing segments. A growing algorithm is useful where segments of the ribs are foreshortened or missing. As part of the growing algorithm, existing segments are aligned according to an anatomy model. Segments are iteratively extended and tested to determine whether or not growth is completed. Segment growth can also use edge extension techniques such as those employed for tubing detection and described in U.S. 2009/0190818 entitled "COMPUTER-AIDED TUBING DETECTION" by Huo.

Still referring to FIG. 6, repeated iteration of the sequence of steps 78, 80, and 84, as many times as needed and used with information from a cross-rib profiling step 88, can help to improve the rib profiles provided. With results of step 88, rib data that is combined with the image data in image conditioning step 92 can help to characterize the rib content for more accurate generation of the rib mask.

Alternative approaches for rib mask generation include selection of a model rib mask from a library of multiple model rib masks. Selection criteria can include size and weight of the patient, view and perspective angle of the obtained image, image detector type, and other factors. Subsequent image processing, similar to that described with respect to FIGS. 5 and 6, is then used to refine and shape the rib mask that is suitable for the particular patient. Still other approaches utilize histogram analysis, with added connectivity criteria, for defining areas of the image that appear to have rib content. Neural network logic or fuzzy classifiers can also be adapted for this purpose, helping to refine the rib shape for more accurate rib mask development.

Multi-spectral or dual-energy imaging provides yet another alternative for either or both rib detection and mask generation step 36 and enhanced processing step 40 (FIG. 3). This type of imaging obtains a high-energy image that is generally better suited for imaging bones and dense structures and a low-energy image that provides better resolution for soft tissue and organs. Further image processing of the high-energy image can provide the enhanced content for improved visibility of rib cage fractures and other problems. The rib mask that is generated can then be used for defining masked enhanced image content from the high-energy image that is to be combined with the low-energy image.

Figure 7A:
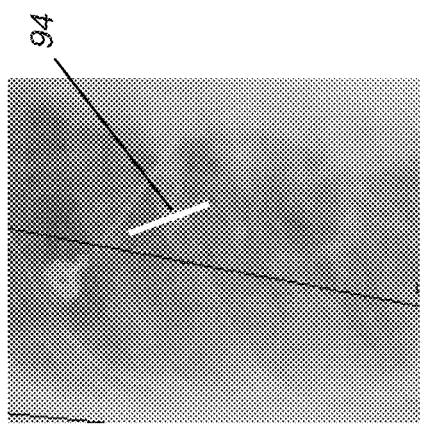
FIG. 7A is a top view showing a reference line for obtaining a rib profile according to an embodiment of the present invention.
Figure 7B:
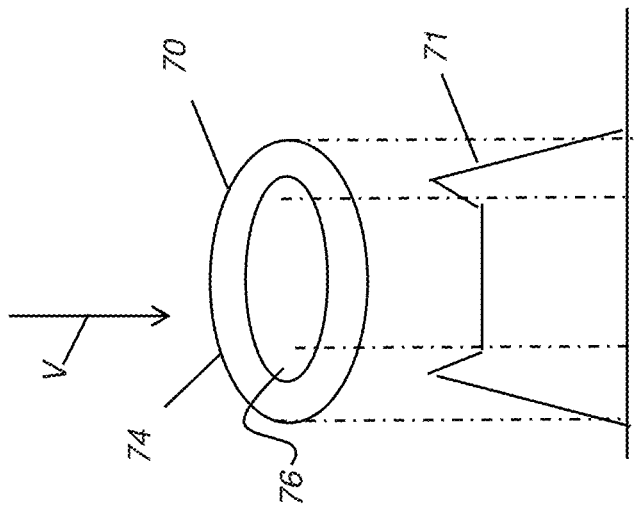
FIG. 7B is a schematic diagram that shows how the rib profile is generated from a radiographic image according to an embodiment of the present invention.

FIGS. 7A and 7B show how a cross-rib profile is generated and its relationship to the chest x-ray image. In FIG. 7A, a line 94 shows the basic direction over which the profile is obtained, across the rib in a cross-sectional manner. In FIG. 7B, a rib 70 is shown schematically in cross section, representing a bony shell 74 and a soft interior portion 76. A profile 71 shows how rib 70 affects image data, with peak values along the edges. X-rays are generally incident in the direction indicated V in this figure.

Profile 71 is generated using known characteristics of the rib in the chest x-ray. One method for providing rib profile 71 is to apply a low-pass filter (LPF) to the chest image and use the results of this processing to provide a cross-rib profile; this method is known to those skilled in image processing and analysis. An alternate method employs a model to provide an initial approximation or starting point for developing the rib profile. Using information from the model also enables rib profile information to be identified and extracted from the image itself. Whatever method is used, the usefulness of the rib profile depends, in large part, upon accurate detection of rib edges. The rib profile can be used, for example, to verify that rib structures have been correctly identified.

Returning to the workflow sequence shown in FIG. 3, a mask suitability checking step 38 analyzes the results of rib detection and mask generation to determine if all ribs were located and represented in the rib mask. If the mask is not acceptable, a refinement step 34 executes, re-attempting rib detection, with tighter image processing and positional constraints, for example.

An enhanced processing step 40 (FIG. 3) executes on the original image to provide the image processing that helps to show rib features more clearly. This processing can include any of a number of techniques that enhance the visibility of rib cage and related connective structures, such as contrast enhancement, gradient detection, and frequency decomposition and enhancement techniques, for example. The output of enhanced processing step 40 is a bone-enhanced image 41.

Referring to the sequence of steps in FIG. 3, an image combination step 42 combines the results of default and enhanced processing and mask generation to generate an output composite image 43. For this step, the refined rib mask that is generated defines those portions of the enhanced processing results, bone-enhanced image 41, that are combined with the default processing results to provide the final output composite image 43. This process can be visualized as an overlay process, in which the final rib mask defines the rib structures which are then superimposed onto the default radiographic image 31. In this way, image combination step 42 processing generates masked enhanced image content that includes detected rib content and combines this image content with the default image content to provide composite image 43. The resulting merged or composite image 43 is then more readily suitable for use in detecting fractures.

Figure 8A:
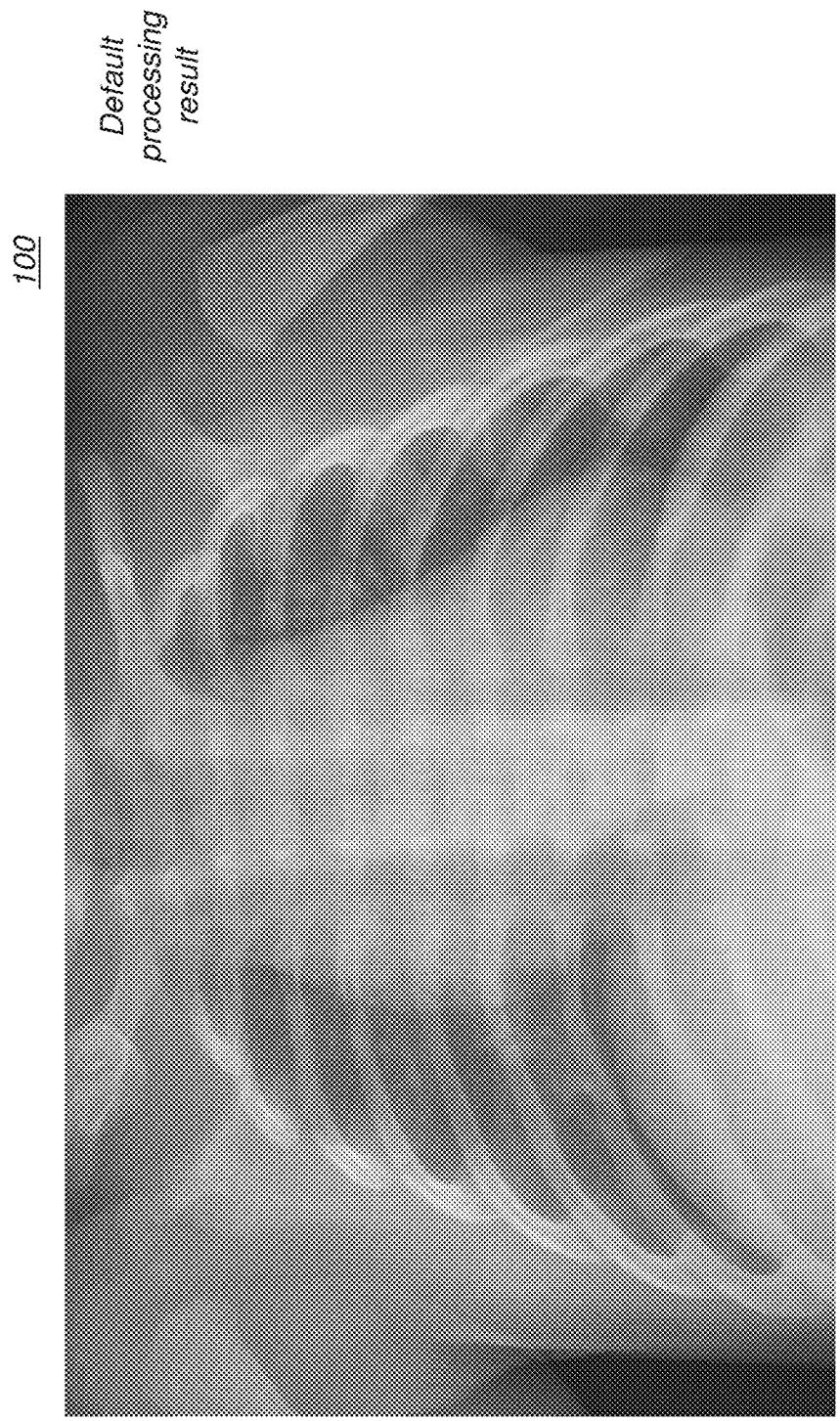
FIG. 8A is an exemplary image showing default processing according to an embodiment of the present invention.

The example in the sequence of FIGS. 8A-8E shows how the composite or merged image is formed by combining masked enhanced image content to the default radiographic image. FIG. 8A is an exemplary image 100 showing default processing, corresponding to default radiographic image 31 of FIG. 3. Even though the ribs can be clearly visible, it can be difficult to discern subtle fractures in an image with default processing as in this example.

Figure 8B:
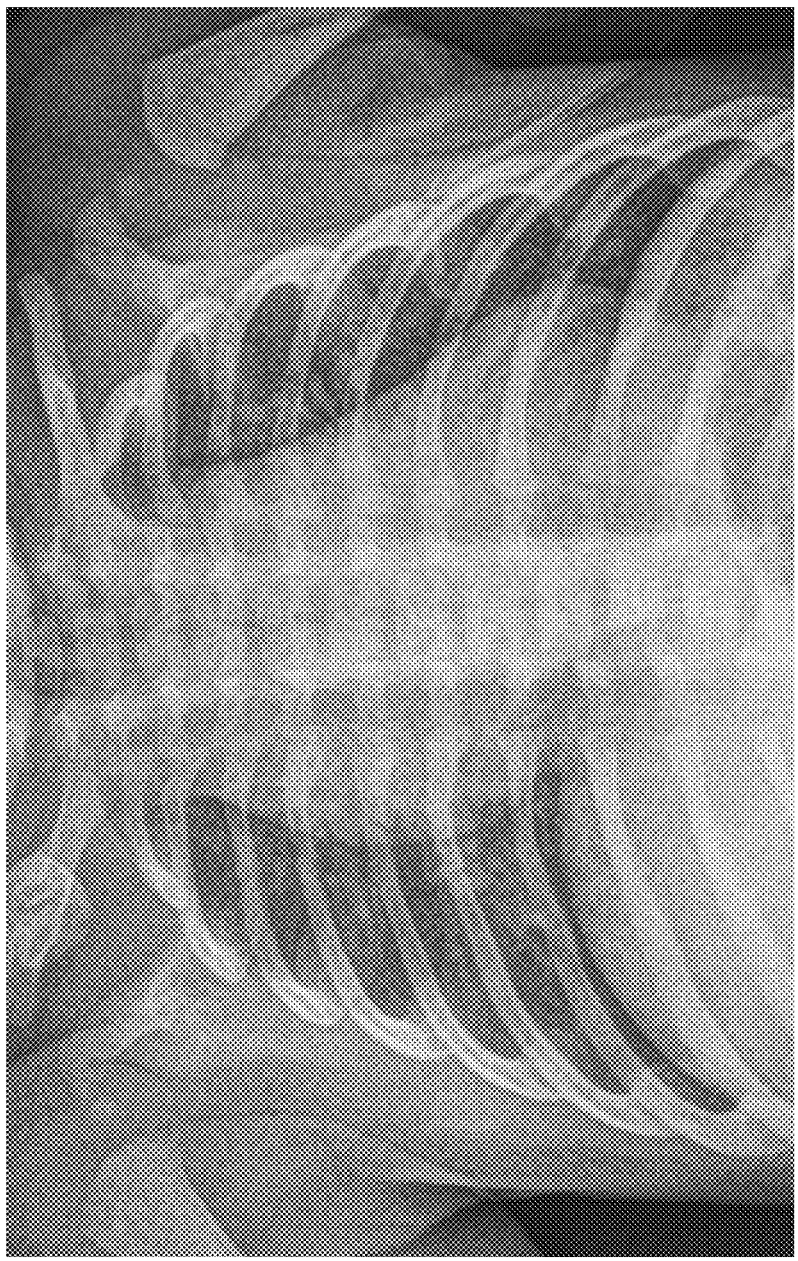
FIG. 8B is an exemplary image showing enhanced processing according to an embodiment of the present invention.

FIG. 8B is an exemplary image 110 showing enhanced processing, corresponding to bone enhanced image 41 of FIG. 3. A number of details are more sharply defined in this image. However, the amount of detail in the non-rib areas makes it difficult to determine where there may be fractures using this image.

Figure 8C:
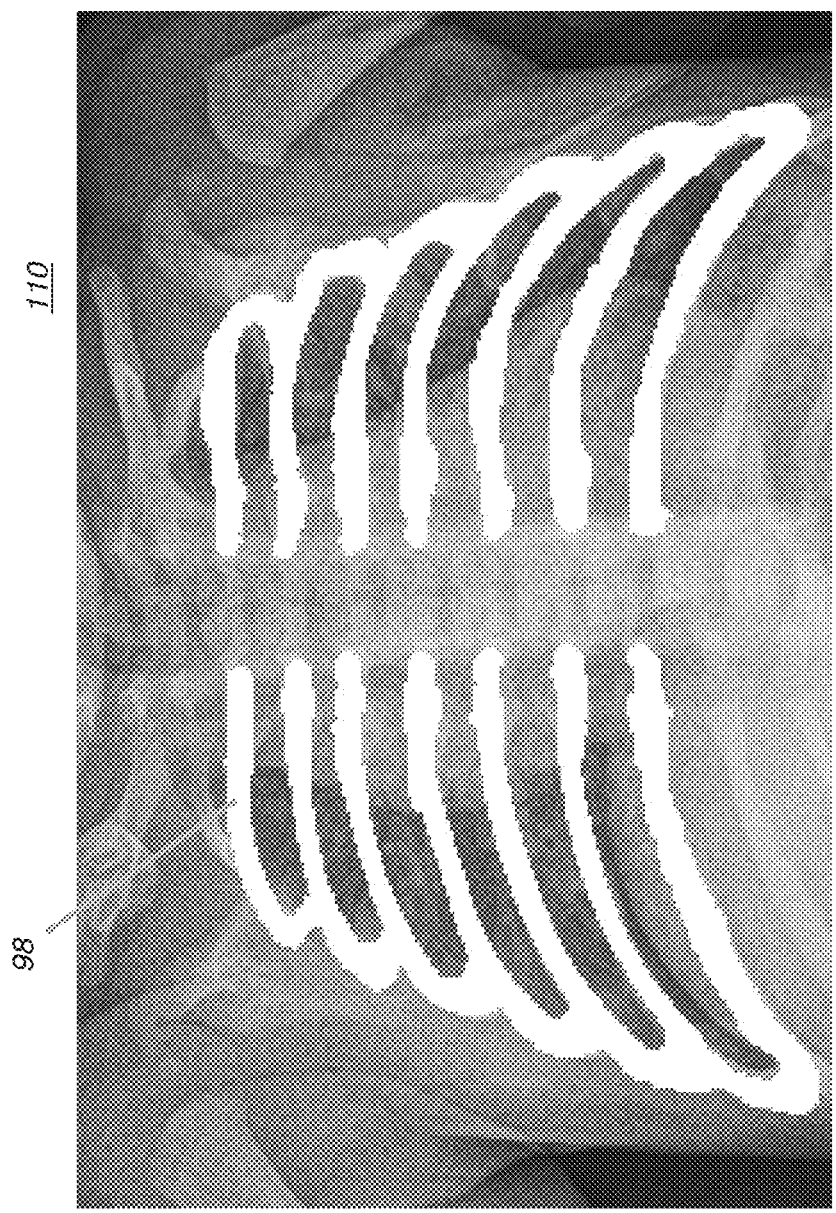
FIG. 8C is an exemplary image showing a partial rib mask according to an embodiment of the present invention.
Figure 8D:
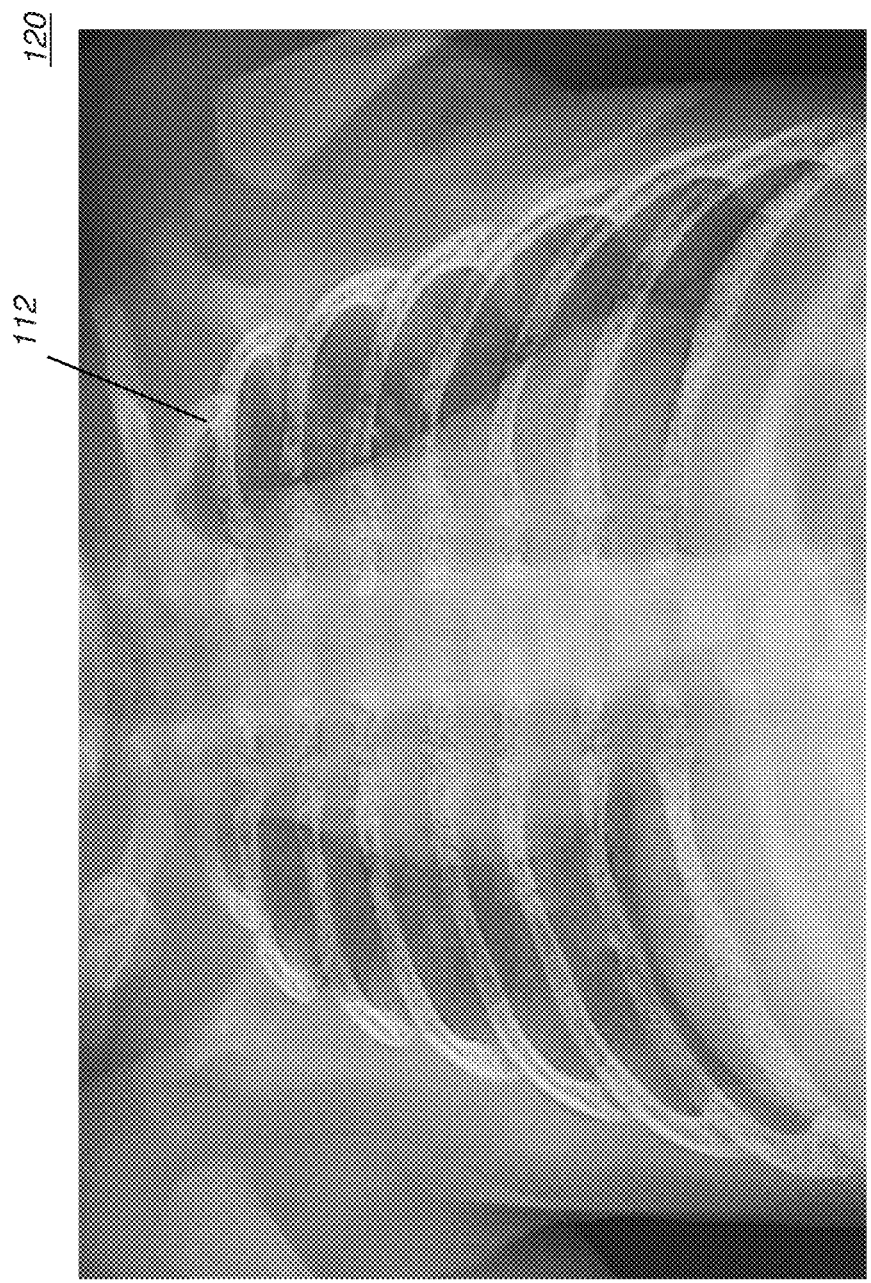
FIG. 8D is an exemplary image showing a composite or merged image having enhanced ribs against an image with default rendering according to an embodiment of the present invention.
Figure 8E:
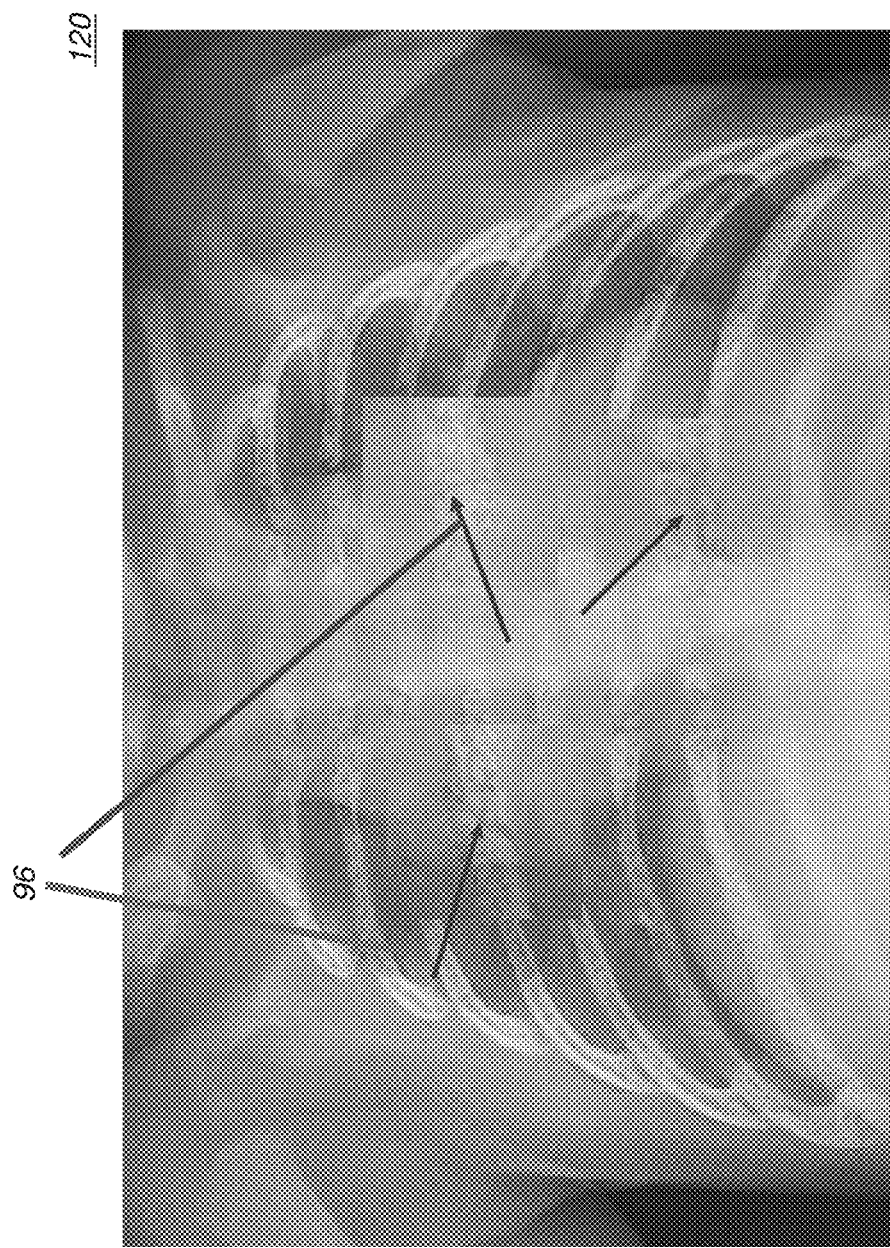
FIG. 8E shows fractures detected in the composite image of FIG. 8D according to an embodiment of the present invention.

FIG. 8C shows image 110 with a partial rib mask 98 that has been generated as previously described with respect to FIGS. 3 and 6. As can clearly be seen, rib mask 98 extends beyond edges of the lung fields in this example. FIGS. 8D and 8E show a merged composite image 120 having enhanced ribs as enhanced image content 112 from image 110 overlaid against image 100 with default rendering. Arrows 96 in FIG. 8E show fractures detected in a merged composite image 120 of FIG. 8D.

As shown in FIGS. 8D and 8E, image combination step 42 uses the rib mask 98 of FIG. 8C to define those portions of the bone-enhanced image of FIG. 8B that are combined with default processed image 8A. Combination of these image pixels is effected by substitution in this example, so that the masked enhanced image content that has been identified using rib mask 98 is simply overlaid onto corresponding pixels of the default image in order to provide the final composite image. It can be appreciated by those skilled in the image processing arts that there a number of other methods that can alternately be used for combining the image data to generate the composite image. According to an alternate embodiment of the present invention, a weighted combination is performed, increasing the contrast of pixels that represent the rib structure by adding some proportional portion of the enhanced pixel value to the existing default pixel value. Combination in pixel-by-pixel fashion is straightforward, since the default image 31 (FIG. 3) and enhanced image 41 are both obtained by processing the same image data obtained from the chest exam. According to yet another alternate embodiment of the present invention, edge enhancement is used to allow the rib structures to be more readily visible, such as by applying various filters to the enhanced image data prior to combination, or to the final combined image.

Embodiments of the present invention thus help to provide accurate detection of rib edges and to allow improved visibility of rib and related fractures. Because the same image is processed in different ways, registration of image content between images is straightforward and can be performed with simple replacement of pixels.

Multi-spectral or dual-energy imaging provides yet another alternative for either or both rib detection step 36 and enhanced processing step 40 (FIG. 3). This type of imaging obtains a high-energy image that is generally better suited for imaging bones and dense structures and a low-energy image that provides better resolution for soft tissue and organs. Further image processing of the high-energy image can provide the enhanced content for improved visibility of rib cage fractures and other problems. The rib mask that is generated can then be used for defining enhanced image content from the high-energy image that is to be combined with the low-energy image.

Consistent with one embodiment, the apparatus utilizes a computer program with stored instructions that perform on image data that is accessed from an electronic memory. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including an arrangement of networked processors, for example. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the art will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

It is noted that there can be any of a number of methods used for image processing functions such as segmentation of ribs from other tissue in the chest x-ray image or for filtering portions of the image content.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for radiographic imaging, executed at least in part on a computer, comprising:
   processing a radiographic image of a patient's chest to generate a default radiographic image and a bone-enhanced image;
   detecting at least a portion of one or more ribs within the default radiographic image;
   generating a rib mask according to the at least the detected portion of the one or more ribs;
   applying the rib mask to the bone-enhanced image to define masked enhanced image content that includes the detected at least the portion of one or more ribs;
   generating a composite image that combines the masked enhanced image content with the default radiographic image; and
   displaying, storing, or transmitting the composite image.

2. The method of claim 1 wherein generating the rib mask comprises performing rib edge segmentation.

3. The method of claim 1 wherein generating the rib mask comprises calculating a medial axis for at least one rib of the rib cage.

4. The method of claim 1 wherein generating the rib mask comprises selecting the rib mask from a library.

5. The method of claim 1 wherein the radiographic image is a dual-energy image.

6. The method of claim 1 wherein detecting the at least the detected portion of the one or more ribs further comprises applying an anatomy mask to define a region of interest in the default radiographic image that includes a portion of a rib cage.

7. The method of claim 6 wherein the anatomy mask is selected according to patient size.

8. The method of claim 1 further comprising evaluating the rib mask and repeating the step of generating the rib mask one or more times.

9. The method of claim 1 wherein generating the rib mask further comprises applying a growing algorithm.

10. A method for radiographic imaging, executed at least in part on a computer, comprising:
- processing a radiographic image of a patient's chest to generate a default radiographic image;
- applying an anatomy mask to define a region of interest in the default radiographic image that includes at least a portion of a rib cage;
- detecting at least a portion of one or more ribs within the defined region of interest;
- generating a rib mask according to the at least the detected portion of the one or more detected ribs;
- generating an enhanced image from the obtained radiographic image;
- applying the rib mask to the enhanced image to define masked enhanced image content that includes the at least the detected portion of the one or more detected ribs;
- generating a composite image by combining the masked enhanced image content with the default radiographic image; and
- displaying, storing, or transmitting the composite image.

11. The method of claim 10 wherein generating the rib mask comprises performing rib edge segmentation.

12. The method of claim 10 wherein generating the rib mask comprises obtaining a medial axis for at least one rib.

13. The method of claim 10 wherein generating the rib mask comprises selecting the rib mask from a library.

14. The method of claim 10 wherein the radiographic image is a dual-energy image.

15. A method for radiographic imaging, executed at least in part on a computer, comprising:
- processing a radiographic image of a patient's chest to generate both a default radiographic image and a bone-enhanced image;
- detecting at least a portion of the rib cage that is within the default radiographic image;
- generating a rib mask according to one or more detected ribs in the detected at least the portion of the rib cage;
- applying the rib mask to the bone-enhanced image to identify masked enhanced image content that includes the detected at least the portion of the rib cage;
- generating a composite image that combines the masked enhanced image content with the default radiographic image; and
- displaying, storing, or transmitting the composite image.

16. The method of claim 15 wherein generating a composite image comprises overlaying the masked enhanced image content onto the default radiographic image.

17. The method of claim 15 wherein detecting the at least a portion of the rib cage comprises applying an anatomy mask generated according to content of the radiographic image.

18. The method of claim 15 wherein detecting the at least a portion of the rib cage comprises applying an anatomy mask to define a region of interest in the default radiographic image that includes a portion of the rib cage.

* * * * *